Nov. 25, 1969     H. NERWIN     3,479,940

AUTOMATIC FILM ADVANCING AND REWINDING SYSTEM

Filed June 26, 1967

HUBERT NERWIN
INVENTOR.

BY Malcolm G. Dunn
Robert W. Hampton
ATTORNEYS

United States Patent Office 3,479,940
Patented Nov. 25, 1969

3,479,940
AUTOMATIC FILM ADVANCING AND
REWINDING SYSTEM
Hubert Nerwin, Rochester, N.Y., assignor to Eastman
Kodak Company, Rochester, N.Y., a corporation of
New Jersey
Filed June 26, 1967, Ser. No. 648,584
Int. Cl. G03b 19/04, 1/04
U.S. Cl. 95—31                                10 Claims

ABSTRACT OF THE DISCLOSURE

A camera is provided with a film advancing and rewinding system operable by a single operating member. There is provided a device for automatically converting the system from its film advancing mode of operation to its rewinding mode when a predetermined length of film has been advanced. This predetermined length of film is variably adjustable by the operator for exposure of a selected number of frames on the film before rewinding.

BACKGROUND OF THE INVENTION

Field of the invention

The present invention relates to improvements in cameras of the type disclosed in commonly assigned pending United States patent application Ser. No. 612,201, entitled "Film Advancing and Rewinding Mechanism," filed in my name on Jan. 27, 1967, and more particularly to means for selecting automatically the mode of operation of the film winding and rewinding mechanism incorporated in such cameras.

DESCRIPTION OF THE PRIOR ART

A camera of the type disclosed by the above-identified pending application includes a film advancing and rewinding system comprising a single knob or other operating member which can be employed either to advance a strip of film to expose successive areas thereof as the film unwinds from a supply spool or core within a film supply chamber or to rewind the film into the supply chamber, with manually operated means being provided to enable the desired mode of operation to be selected.

SUMMARY OF THE INVENTION

As a further improvement to such a camera, a preferred embodiment of the present invention contemplates associating with the film advancing and rewinding system a mechanism for converting the system automatically from its film advancing mode of operation to its rewinding mode when a length of film corresponding to a predetermined number of exposure areas has been advanced, so that the operator need not observe the progress of the film advancing operation and manually convert the mechanism from one function to the other. In addition to thus simplifying the operation of the camera, this feature also ensures that the film advancing operation is discontinued before the film is drawn taut, and perhaps thereby damaged, as may otherwise occur if the film advancing operation is continued after all of the film has been unwound from the supply core or spool. Since the latter feature is also relevant to conventional cameras having separate operating members for the respective film advancing and rewinding mechanisms incorporated therein, an alternate embodiment of the invention contemplates employing a similar arrangement merely to disable the film advancing means when a predetermined length of film has been advanced, without necessarily influencing the film rewinding mechanism.

BRIEF DESCRIPTION OF THE DRAWINGS

Various means for accomplishing the invention will be apparent from the following detailed description of an illustrative preferred embodiment thereof, reference being made to the accompanying drawings in which like reference numerals denote like elements and in which.

DESCRIPTION OF THE PREFERRED EMBODIMENT

Figure 2:
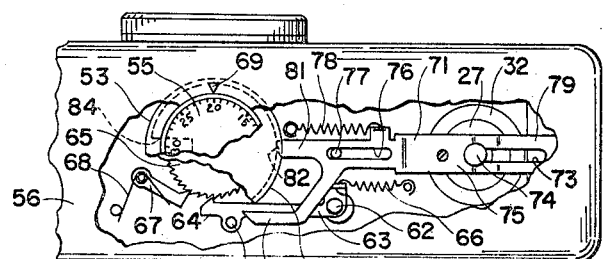
FIG. 2 is a partial top plan view of the camera illustrated in FIG. 1 with a portion of the top casing member shown broken away.

In the illustrated embodiment of the invention, the subject camera comprises a generally boxlike housing 11 including a rearwardly extending film guide member 12 defining a flat film support surface 13 adapted to support an area of a strip of film 14 at the focal plane of objective lens 15. A film cassette 16 is located adjacent one side of member 12 with its internal spool member 17 rotatably engaged by a slotted projection 18 extending upwardly from gear 19 and straddling web 20 in the hollow core of the spool member. Gear 19 is supported for rotational movement on housing 11 by a stud 21, extending into the lower housing wall member 22, with corresponding gears 23 and 24 being supported similarly by studs 25 and 26, respectively.

At the side of housing 11 opposite the film cassette, the end of the film strip is attached to a film take-up core 27, rotatably supported at its top end in bore 28 extending through upper wall member 29 and prevented from moving axially by shoulder 31 and collar 32. An operating knob 33 is rotatably supported below and in coaxial alignment with core 27 by a bushing 34, which is pressed into the knob and extends through the lower housing wall member 22 and also through gear 35, thereby maintaining that gear in rotatable constantly meshed engagement with the adjacent gear 24. Within the knob, a pawl 36 is mounted to the lower housing wall 22 by a pin 37 and is urged into engagement with an internal ratchet surface 38 by a spring 39 to limit rotation of the knob to a clockwise direction as viewed from the bottom of the camera.

A shaft 41 extends upwardly through core 27 and is rotatably and slidably supported at its opposite ends by bore 42 in the core and by a similar bore 43 in bushing 34. At its lower end, shaft 41 is rotatably coupled to winding knob 33 by means of a pin 44 extending through the rotatable bushing and received by a slot 45 in the shaft, whereby the shaft is movable axially but remains in rotational driving engagement with the knob. An enlarged portion of the shaft, shown at 46, provides lateral support for the lower end of the winding core and also engages a compression spring 47 urging shaft 41 downwardly toward the position shown in FIG. 3.

Figure 1:
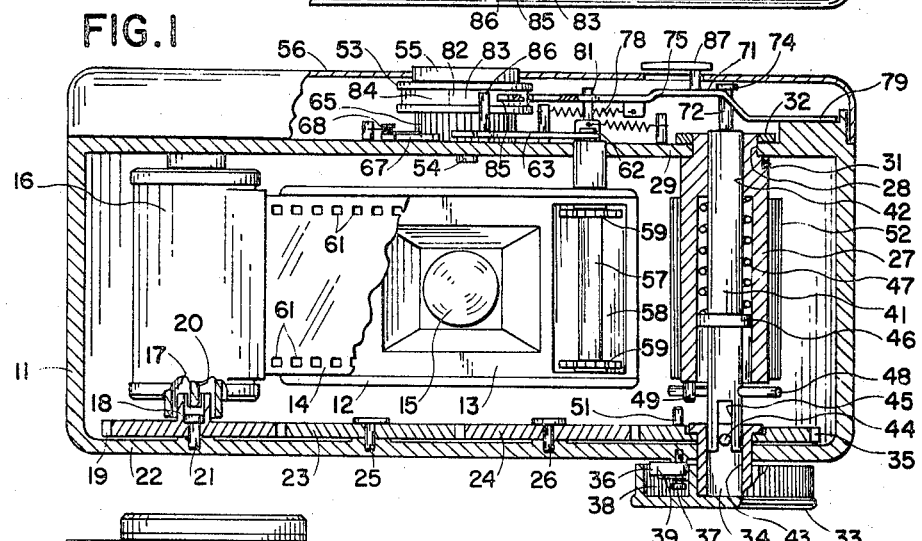
FIG. 1 is a rear elevational view of a camera according to a preferred embodiment of the invention, with the camera back removed and various portions of the camera structure shown cross-sectioned or broken away to illustrate internal details of the film advancing and rewinding mechanisms, the components of which are shown in the positions assumed thereby during the film advancing operation.

To transmit selectively the rotational movement of the winding knob either to core 27 or to cassette spool member 17, shaft 41 is provided with a pin 48 extending therethrough, which is adapted to engage one or the other of studs 49 and 51, extending respectively from core 27 and gear 35. By this arrangement, the core is rotated with the shaft when the shaft is in its raised position, shown in FIG. 1; and the cassette spool member is rotated in the direction opposite to that of shaft 41, through the four-gear train comprising constantly meshed gears 19, 23, 24, and 35, when the shaft is in its lower position, shown in FIG. 3. Since pin 48 engages only one or the other of studs 49 and 51, it should be apparent that the cassette spool member is freely rotatable when the take-up core is in driving relation with the winding knob and that the take-up core is similarly free to rotate when the cassette spool member is so engaged with the knob, retarded only by the slight frictional braking effect of spring 47. Accordingly, during the film advancing operation, the shaft is positioned as shown in FIG. 1, whereby rotation of the winding knob causes the film to be advanced past lens 15 as it is unwound from the cassette and wound onto the take-up core as shown at 52. To rewind the film into the cassette, the shaft is displaced to the position shown in FIG. 3, so that further rotation of the knob causes the film to be unwound from the core and rewound onto the film supply member in the cassette, with the slight braking effect of spring 47 ensuring that the film is rewound in smooth, even convolutions.

The above-described mechanism is similar to the corresponding structure disclosed in my above-identified pending application, which is manually set to perform the desired winding or rewinding operation. However, in accordance with the present invention, the winding knob is automatically disassociated from the winding core and operatively connected to the film supply member to rewind the film when a length of film corresponding to a predetermined number of exposures has been advanced past the exposure position aligned with lens 15. The mechanism employed for this purpose includes a metering member 53, rotatably supported by stud 54 and including a numbered dial 55 extending through the cover member 56 of the camera. A sprocket shaft 57 is supported in a recess 58 in film guide member 12 and is provided with a pair of sprocket wheels 59 adapted to engage sprocket holes 61 in the film strip, whereby the sprocket shaft is rotated one revolution whenever the film is advanced by a distance corresponding to one exposure frame. At the top end of the sprocket shaft, an eccentric pin 62 is received within a corresponding hole at one end of a pawl member 63, the opposite end of which is provided with a tooth 64 urged against the ratchet wheel portion 65 of metering member 53 by a spring 66. A second pawl 67 is also urged into contact with the same ratchet portion of the metering member by a spring 68, to limit rotation of the metering member to a counterclockwise direction as viewed from the top. By providing the ratchet wheel portion of the metering member with uniformly spaced teeth corresponding in angular relation to the exposure numbers and markings on the dial, each revolution of the sprocket causes the metering member to rotate by one tooth and to move the dial by one numerical unit.

During the process of loading the camera, the operator rotates the dial manually in a counterclockwise direction, as viewed from the top, to align with reference mark 69 the number or mark on the dial corresponding to the number of exposures provided on the film strip in the particular cassette being used. Thereafter, as the film is advanced, the movement of each successive exposure frame past the lens causes the next smaller number or mark on the dial to be aligned with the reference mark to indicate the number of exposure areas still available for exposure. For example, FIG. 2 shows the dial set to the number 20, which would be the appropriate initial setting when the camera is loaded with a cassette comprising a film strip of appropriate length to provide twenty successive exposure areas.

Figure 4:
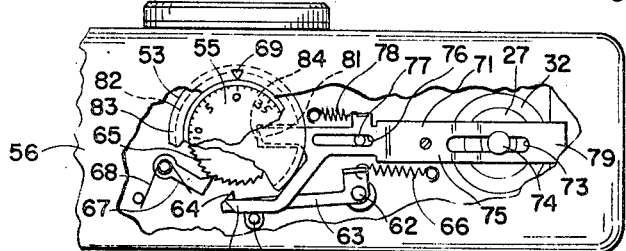
FIG. 4 is a view corresponding to FIG. 2, showing the depicted components positioned as illustrated in FIG. 3.

When the camera has been loaded and the dial set, shaft 41 is retained in its raised position, against the influence of spring 47, to maintain the winding knob in driving engagement with winding core 27 by means of pin 48 and stud 49. This is accomplished by means of slide member 71, which receives the upper end portion 72 of shaft 41 through a slot 73, with the head 74 at the top end of the shaft being supported by the raised central surface 75 of the slide member. Slot 73 and a similar slot 76, adapted to receive guide pin 77, allow the slide member to be moved by a spring 78 from the film advancing position shown in FIGS. 1 and 2, to the film rewinding position shown in FIGS. 3 and 4. When the slide member is in the latter position, its lower end surface 79 is aligned with shaft portion 72, thereby allowing the shaft to be moved by spring 47 to its lower position in which pin 48 is disengaged from stud 49 on the core and engaged with stud 51 on gear 35. Until all of the available film exposure areas have been advanced into alignment with lens 15, the slide member is retained in the position shown in FIGS. 1 and 2 by the abutment of tongue 81 thereon against the bottom surface 82 of annular groove 83 in the metering member. However, when the metering member has rotated to the zero position, indicating that all of the available exposure frames have been advanced past the lens, a notch 84 at the bottom of the groove is aligned with and receives tongue 81 to allow movement of the slide member to the film rewinding position, as shown in FIGS. 3 and 4.

As the film is rewound, the sprocket holes 61 therein remain engaged with sprockets 59, but the metering member is blocked against rotation by tongue 81. Therefore, unless the sprocket shaft is disengaged from driving engagement with the metering member, the rewinding of the film would be blocked by the inability of the sprocket shaft to rotate freely. Accordingly, the slide member includes a leg 85 adapted to engage an upstanding pin 86 on pawl member 63 when tongue 81 is received in notch 84, to move tooth 64 out of engageable relation with the ratchet wheel portion of the metering member. Thus, as the film is rewound, the pawl member simply reciprocates out of engagement with the metering member as the sprocket shaft is rotated.

Figure 3:
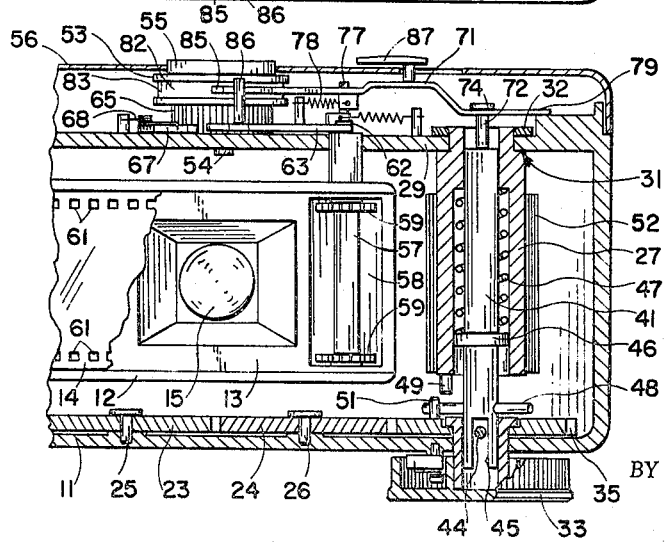
FIG. 3 corresponds to a portion of FIG. 1 and shows the positions of the illustrated components during the film rewinding operation.

After the cassette has been rewound and removed and a fresh cassette then installed in the camera, the operator returns the slide member to the position shown in FIGS. 1 and 2 by moving the externally accessible slide button 87 toward the adjacent end of the camera and then, while holding button 87 in that position, rotating the metering member to the appropriate setting, thereby moving notch 84 out of alignment with tongue 81. When the slide button is then released, the slide member is retained in the position shown in FIGS. 1 and 2 by the tongue's engagement with surface 82, and will remain so positioned until notch 84 is again moved into alignment with the tongue after the dial has been rotated sufficiently to move its zero reference numeral into alignment with reference mark 69.

Although the above-described camera employs a winding knob as the driving member for the film advancing and rewinding mechanism, it should be apparent that a lever or other similar device could be substituted readily for such a winding knob. Similarly, the driving member could comprise a power-operated device, such as an electric motor or a spring motor, adapted to advance the film, frame by frame, in response to operation of the camera shutter and to rewind the film when a predetermined number of frames have been exposed; or, such a spring motor or the like might be associated with the mechanism in such a manner that the manual film advancing operation would wind the motor, which would then be used to rewind the film automatically at an appropriate time. In still another possible embodiment, means similar to those disclosed for converting the mechanism from the winding to the rewinding function in response to the exposure counting mechanism might be employed beneficially in a camera having a conventional separate rewinding member, only for the purpose of disengaging the winding member automatically from the take-up core after a predetermined length of film has been advanced, to prevent the film from being separated from its supply spool member or otherwise damaged by further operation of the winding member. Also, in any such embodiment or variation, it should be appreciated that a sprocket member or similar means might be employed to impart motion to the film, as might be done, for example, in a camera in which the film is wound upon itself in a take-up chamber, in which case the sprocket member or its equivalent would be operatively associated with the driving member by means of a mechanism similar to those previously described.

The invention has been described in detail with particular reference to preferred embodiments thereof, but it will be understood that variations and modifications can be effected within the spirit and scope of the invention as described hereinabove and as defined in the appended claims.

I claim:

1. In a camera comprising:
   (a) a film transport mechanism adjustable to
      (1) a first condition in which said mechanism is operable to move an elongate strip of film in a first direction along a path including a film exposure location aligned with an optical system, and
      (2) a second condition in which said mechanism is operable to move said strip in a second direction opposite to said first direction;
   the improvement comprising:
   (b) means for adjusting said mechanism automatically from said first condition to said second condition when a predetermined portion of said strip has been moved along said path in said first direction past said location by said mechanism adjusted to said first condition.

2. In a camera comprising:
   (a) means for rotatably supporting a film supply member bearing an elongate strip of film wound on said member, and
   (b) film advancing means for moving a portion of said film along a predetermined path to position successive exposure areas along said film at a film exposure location as said film is progressively unwound from said supply member by such movement thereof;
   the improvement comprising:
   (c) disabling means for disabling said film advancing means automatically when a predetermined number of such exposure areas have been so positioned and before the entire length of said film has been so unwound from said supply member.

3. The invention defined by claim 2 including an externally accessible operating member operatively engageable with said film advancing means for operation of said film advancing means, said disabling means being adapted to operatively disengage said operating member from said film advancing means.

4. In a camera comprising:
   (a) film advancing means adapted to move an elongate strip of film to successively align consecutive portions of said film with an optical system, and
   (b) a metering member adapted to move to successive predetermined positions corresponding respectively to the alignment of successive ones of said consecutive portions with said system;
   the improvement comprising:
   (c) means operatively associating said metering member with said film advancing means for disabling said film advancing means in response to movement of said metering member to a predetermined one of said positions.

5. In a camera comprising means for advancing an elongate strip of film to successively align consecutive areas of said film with an optical system as said film is wound from a rotatable film supply member onto a rotatable film take-up member, said camera including a metering member movable in response to such film advancement to successive predetermined positions corresponding respectively to the alignment of successive ones of said consecutive areas with said optical system, the improvement comprising:
   (a) a movable operating member,
   (b) means for disengageably engaging said operating member in driving relation with said take-up member for translating movement of said operating member into film winding rotational movement of said take-up member, and
   (c) connecting means operatively associated with said metering member for disengaging said operating member from driving realtion with said take-up member in response to movement of said metering member past a predetermined number of said predetermined positions.

6. In a camera comprising:
   (a) a film transport mechanism adjustable to
      (1) a first condition in which said mechanism is operable to move an elongate strip of film in a first direction to move successive portions therealong into consecutive alignment with an optical system, and
      (2) a second condition in which said mechanism is operable to move said elongate strip of film in a second direction opposite to said first direction, and
   (b) a movable metering member adapted to assume successive predetermined positions corresponding respectively to the alignment of successive ones of said portions with said system as said film is moved in said first direction;
   the improvement comprising:
   (c) adjusting means operatively associating said metering member with said transport mechanism for adjusting said mechanism from said first condition to said second condition in response to movement of said metering member to a predetermined one of said positions.

7. The invention defined by claim 6 including:
   (a) a rotatable element included in said metering member, said element being rotatable through successive angular increments defining said successive predetermined positions in response to respective movement of corresponding successive portions of said film into alignment with said optical system,
   (b) a movable abutment member included in said adjusting means, said abutment member being movable between
      (1) a first position in which said film transport mechanism is thereby adjusted to said first condition and
      (2) a second position in which said film transport mechanism is thereby adjusted to said second condition, and
   (c) shifting means including surface means on said rotatable element engageable by said abutment member, said shifting means being adapted to effect movement of said abutment member to said second position in response to rotational movement of said element through a predetermined number of said successive angular increments.

8. The invention defined by claim 6 including means defining on said metering member visible indicia indicative of the stage of advancement of said film as reflected by the corresponding position of said metering member.

9. The invention defined by claim 7 including means for selectively establishing the number of successive angular incremental movements of said element required to effect movement of said abutment member to said second position.

10. In a camera comprising:
(a) means for rotatably supporting a film supply member,
(b) means for rotatably supporting a film take-up member,
(c) a unidirectionally rotatable driving member,
(d) film advancing means for operatively coupling said driving member to a take-up member so supported for rotating said take-up member to wind film from said supply member onto said take-up member,
(e) film rewinding means operable to uncouple said driving member from said take-up member and to operatively couple said driving member to a supply member so supported for rotating said supply member to rewind film from said take-up member onto said supply member, and
(f) a device for monitoring the movement of film between said supply and take-up members as said film is wound from said supply member onto said take-up member;

the improvement comprising:
(g) means operatively connecting said device with said film rewinding means for operating the latter in response to movement of a predetermined portion of said film between said supply and take-up members as said film is wound from said supply member onto said take-up member.

References Cited

UNITED STATES PATENTS

| | | | |
|---|---|---|---|
| 3,079,850 | 3/1963 | Goldhammer | 95—31 |
| 3,137,457 | 6/1964 | Beach | 242—71.6 |
| 3,380,364 | 4/1968 | Bethmann | 95—31 |

NORTON ANSHER, Primary Examiner

JOSEPH F. PETERS, JR., Assistant Examiner

U.S. Cl. X.R.

242—71.6